2,953,572
Patented Sept. 20, 1960

2,953,572

PYRIDINECARBOXYLIC ACID 1-OXIDES

Jesse T. Dunn, Charleston, and Donald Lee Heywood, South Charleston, W. Va., assignors to Union Carbide Corporation, a corporation of New York No Drawing. Filed Aug. 25, 1958, Ser. No. 757,089

9 Claims. (Cl. 260—295)

This invention relates in general to a new series of pyridine oxides and more particularly to pyridinepolycarboxylic acid 1-oxides and a method for their preparation.

In recent years, several methods have been reported in the literature for the preparation of pyridinemonocarboxylic acid 1-oxides. These compounds and their derivatives have found use in the stabilization of peracids and hydrogen peroxide. Nicotinic acid 1-oxide, for example, has been prepared by peroxidation of nicotinic acid with hydrogen peroxide and acetic acid. Also by the oxidation of an alkylpyridine 1-oxide, such as 4-nitro-3-methylpyridine 1-oxide, a good yield of the 4-nitronicotinic acid 1-oxide can be obtained. Several other methods are known whereby the pyridinemonocarboxylic acid 1-oxides can be obtained in good yields.

While the known methods for synthesizing the pyridinemonocarboxylic acid 1-oxides gave good results, when such methods were used in an attempt to prepare the pyridinepolycarboxylic acid 1-oxides, no reaction occurred, and the starting pyridinepolycarboxylic acids were quantitatively recovered. Despite the amount of work done on pyridine 1-oxides, none of the pyridinepolycarboxylic acid 1-oxides have been reported in the literature.

While not wishing to be bound by the particular mechanism which favors the formation of pyridinepolycarboxylic acids rather than the corresponding 1-oxide, a consideration of the possible factors will aid in understanding the present invention. It is known that oxidation of a neucleophilic functional group by peracids involves an electrophilic attack by the peracid on the electron-rich functional group, whether it be a double-bond, nitrogen atom, sulfur atom, or the like. Any factor that causes a decrease of the electron density at the neucleophilic center of the compound being oxidized, results in a much slower rate of oxidation. A second factor which greatly influences the rate of reaction of oxidation is the well-known phenomenon of steric hindrance which, due to the physical structure of adjacent groups, shields or blocks the reactive center.

Both factors, the diminution of electron density at the electron-rich center and steric hindrance, are believed to be operative in causing the pyridinepolycarboxylic acids to be unreactive towards 1-oxide formation. The net effect is withdrawal of electrons from the pyridine ring leaving an electron-deficient nitrogen atom. Additionally, where the carboxy group is in the alpha position to the nitrogen atom, the well-known "zwitterion" effect can exist where the nitrogen and oxygen of the acid group are "bridged" through hydrogen bonding.

It would thus appear that due to a combination of several factors, the pyridinepolycarboxylic acids are resistant to oxidation to the corresponding 1-oxides. It is therefore an object of the present invention to provide a new series of new pyridinepolycarboxylic acids 1-oxides and a method for their preparation whereby these compounds are prepared in good yield.

A further object of the present invention is to provide pyridinepolycarboxylic acid 1-oxides which are useful as stabilizers.

Another object is to provide pyridinepolycarboxylic acid 1-oxides which are useful in the preparation of polyester condensation resins.

Other objects and a fuller understanding of the invention will be had by referring to the following description and claims.

According to the present invention, a series of new pyridine 1-oxides are prepared by a special oxidation technique where such compounds could not be prepared by the usual peroxidation methods.

The compounds of this invention may be illustrated by the following general formula:

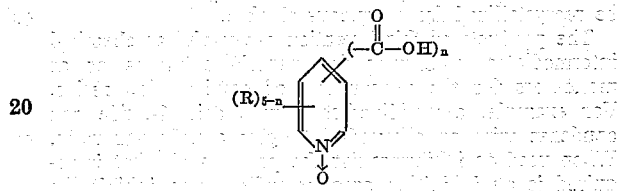

wherein $(n)$ is a whole positive integer of from 2 to 4 and R is a member selected from the group consisting of hydrogen, lower alkyl, and nitro groups.

Representative of the compounds of the invention are quinolinic acid 1-oxide, lutidinic acid 1-oxide, 2,5-pyridinedicarboxylic acid 1-oxide, 2,6-pyridinedicarboxylic acid 1-oxide, cinchomeronic acid 1-oxide, 3,5-pyridinedicarboxylic acid 1-oxide, 2,4,6-pyridinetricarboxylic acid 1-oxide, 2,3,6-pyridinetricarboxylic acid 1-oxide, 2,3,5,6-pyridinetetracarboxylic acid 1-oxide, 4-methyl-2,6-pyridinedicarboxylic acid 1-oxide, 4-nitro-2,6-pyridinedicarboxylic acid 1-oxide, and the like.

It was found that all of the factors which were discussed above and which prevented the peroxidation technique from being used to prepare the pyridinepolycarboxylic acid 1-oxides from the corresponding pyridinepolycarboxylic acids were entirely removed or greatly reduced if the acids were reacted in the form of the metal salt. By employing, for example, the disodium, dipotassium or other salt, the resonance effect is probably reversed, since what was an electron withdrawing group $$(-\overset{O}{\underset{\|}{C}}-OH)$$

is now a negative group $$(-\overset{O}{\underset{\|}{C}}-O-)$$

which actually repels electrons, thus maintaining or increasing the electronic density at the nitrogen atom. The steric effect is also reduced by the mutual repulsion of the negative carboxy groups, and lastly, hydrogen bonding to give the "zwitterion" formation is not possible.

In the practice of this invention, in order to oxidize the polysodium salt of the pyridinepolycarboxylic acid, the acid is taken up in solution and a known amount of aqueous or alcoholic sodium hydroxide is added. Since peracids decompose rapidly in the presence of a strong base, an excess of alkali is avoided. Excess of oxidizing agent (peracid) is then added and, after warming the solution for several hours, it is cooled, acidified and the pyridine 1-oxide compound separated.

In the preferred practice of this invention, the pyridinepolycarboxylic acid 1-oxide to be oxidized is dissolved in a solution of sodium hydroxide of a concentration of from about 5 to about 20 percent by weight. Other alkali hydroxides can be used either in water or other suitable solvent. An excess of peracetic acid in acetic acid or other suitable solvent is then added dropwise, the mixture being maintained at 50° C. While other peracids may be used, such as performic, perbenzoic and the like, peracetic is preferred. The molar ratio of peracid to the pyridinepolycarboxylic acid is not necessarily critical and can be varied from about 1.25 to about 5.0, although the molar ratios above and below the aforesaid range can be employed if desired. Reaction temperatures of from about 30° C. to about 100° C. may be used.

During the addition of the peroxidant, additional sodium hydroxide solution is added simultaneously and in an amount sufficient to maintain complete solution and yet avoid taking the solution to alkalinity. Finally, the solution is warmed on a steam bath for from about 1 to 3 hours, cooled to room temperature and the pH adjusted to less than 1 with a concentrated acid such as hydrochloric. The product is washed, dried and can be recrystallized from aqueous alcohol.

The products of this invention are useful as chemical intermediates, stabilizers for peracid solutions or as monomers for the preparation of condensation resins. For example, a pyridinedicarboxylic acid 1-oxide can condense with an alkanediol to give a polyester resin. When used as inhibitors for the peracids all that is required is an inhibiting amount sufficient to inhibit the peracid from decomposition. Concentrations of from about 0.01 percent to about 1 percent by weight are preferred.

Preparation of the pyridinepolycarboxylic acids, the starting materials of this invention, can be effected by methods known to the art. For example, isocinchomeronic acid can be synthesized by oxidation of 2-methyl-5-ethylpyridine with nitric acid.

The following examples are given by way of illustration of the present invention.

EXAMPLE I

2,5-pyridinedicarboxylic acid 1-oxide

Isocinchomeronic acid monohydrate (15.0 grams, 0.275 mole) was dissolved in 90 grams of 10 percent aqueous sodium hydroxide and 45 grams of water. To this solution was added 25 grams of a solution of 45 percent peracetic acid in acetic acid, concurrently with 20 grams additional 10 percent aqueous sodium hydroxide. The reaction was stirred vigorously during this time (20 mins.), and temperature was 40° C. After stirring for 1 hour more, 16 additional grams of peracetic acid were added, and the mixture heated for 1 hour on the steam bath. After cooling, the solution was acidified with conc. HCl, filtered, and the product washed with cold water and dried. Yield of isocinchomeronic acid 1-oxide was 14 grams, (86 percent) of light tan crystals, M.P. 241–244° C. A mixed melting point with isocinchomeronic acid showed a marked depression: 216–218° C. Anal.: Calc'd for $C_7H_5O_5N$— acid equivalent, 91.5; percent C, 45.9; percent H, 2.73; percent N, 7.65. Found— acid equivalent, 91.9; percent C, 46.1; percent H, 3.2; percent N, 7.73.

A sample of this product was decarboxylated by heating in ethylene glycol at 150° C. for 30 mins. to give nicotinic acid 1-oxide, M.P. after recrystallization from methanol, 246–248° C. d. (uncorr.). Mixed M.P.'s of this nicotinic acid 1-oxide with nicotinic acid (M.P. 234° C.) and isocinchomeronic acid 1-oxide (above) showed marked depressions (199–208° C. and 187–230° C., respectively). Acid equivalent: Calc'd for $C_6H_5O_3N$— 139; found 143.

EXAMPLE II

2,6-pyridinedicarboxylic acid 1-oxide 2,6-pyridinedicarboxylic acid (5.01 grams, 0.03 mole) was dissolved in 30 grams 10 percent aqueous sodium hydroxide and 15 grams water. To this was added 10 grams of a solution of 45 percent peracetic acid in acetic acid concurrently with 20 grams additional sodium hydroxide solution. After heating at 60° C. for 1 hour, an additional 5 grams peracetic acid solution was added and the mixture was warmed on steam for an additional hour. After cooling and acidifying with conc. HCl, the product was filtered to give 4 grams (73 percent) 2,6-pyridinedicarboxylic acid 1-oxide as a white, crystalline product, M.P. 155–157° C. A mixed M.P. with 2,6-pyridinedicarboxylic acid was depressed (151° C.), and a mixed M.P. with picolinic acid 1-oxide (M.P. 157–159° C.) was also depressed (116° C.). Anal.: Calc'd for $C_7H_5O_5N$: acid equivalent, 91.5; percent C, 45.9; percent H, 2.73; percent N, 7.65.— Found: acid equivalent, 93; percent C, 45.54; percent H, 3.06; percent N, 7.94.

A sample of this 2,6-pyridinedicarboxylic acid 1-oxide was decarboxylated by heating at 148–163° C. for 4 minutes, and the resultant product recrystallized from methanol to give picolinic acid 1-oxide, M.P. and mixed M.P. with authentic picolinic acid 1-oxide, 153–154° C.

EXAMPLE III

Stabilization of peracetic acid solution with 2,6-pyridinedicarboxylic acid 1-oxide Samples of peracetic acid in ethyl acetate (initial conc. 43.7%) were heated at 80° C. in glass vessels. Periodic titrations for peracetic acid gave the following percent by weight of peracetic acid at the time indicated.

| Time | Control (no inhibitor) | | Solution with 0.1% 2,6-Pyridinedicarboxylic acid 1-oxide added | |
|---|---|---|---|---|
| | #1 | #2 | #1 | #2 |
| | Percent | Percent | Percent | Percent |
| 0 | 43.7 | 43.7 | 43.7 | 43.7 |
| 21 hrs | 30.6 | 29.0 | 32.1 | 29.9 |
| 41.5 hrs | 15.1 | 13.2 | 22.3 | 19.7 |
| 63 hrs | 6.6 | 5.2 | 15.3 | 14.5 |

What is claimed is:
1. An unsubstituted pyridinepolycarboxylic acid 1-oxide.
2. A compound of the general formula:

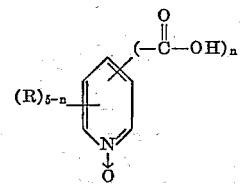

wherein (n) is a whole positive integer of from 2 to 4 and R is a member selected from the group consisting of hydrogen, lower alkyl, and nitro groups.

3. An unsubstituted pyridinedicarboxylic acid 1-oxide.
4. A new composition of matter, 2,5-pyridinedicarboxyilc acid 1-oxide.
5. A new composition of matter, 2,6-pyridinedicarboxylic acid 1-oxide.
6. A process of preparing a compound of the general formula:

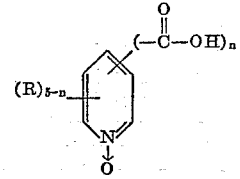

wherein (n) is a whole positive integer of from 2 to 4 and R is a member selected from the group consisting of hydrogen, lower alkyl, and nitro groups; which comprises the steps of preparing the metal salt of said compound, oxidizing said metal salt with an oxidizing agent to the pyridinepolycarboxylic acid 1-oxide and recovering said 1-oxide.

7. A process as claimed in claim 6 wherein the oxidizing agent is a peracid.

8. A process as claimed in claim 7 wherein the oxidizing agent is peracetic acid.

9. A process of preparing a pyridinepolycarboxylic acid 1-oxide which comprises the step of preparing the alkali metal salt of a pyridinepolycarboxylic acid, oxidizing said salt with a peracid to the pyridinepolycarboxylic 1-oxide, and recovering said 1-oxide.

References Cited in the file of this patent

UNITED STATES PATENTS

| | | |
|---|---|---|
| 2,436,660 | Mueller | Feb. 24, 1948 |
| 2,609,391 | Greenspan | Sept. 2, 1952 |
| 2,624,655 | Greenspan | Jan. 6, 1953 |
| 2,663,621 | Greenspan | Dec. 22, 1953 |

FOREIGN PATENTS

| | | |
|---|---|---|
| 734,467 | Great Britain | Aug. 3, 1955 |